United States Patent
Lozada

(12) 
(10) Patent No.: US 6,316,906 B1
(45) Date of Patent: Nov. 13, 2001

(54) KINETIC BATTERY SYSTEM

(76) Inventor: Alfredo Lozada, 2621 SW 26 La., Miami, FL (US) 33133

( * ) Notice: Subject to any disclaimer, the term of this patent is extended or adjusted under 35 U.S.C. 154(b) by 0 days.

(21) Appl. No.: 09/732,578

(22) Filed: Dec. 8, 2000

(51) Int. Cl.[7] .................................................. H01M 10/46
(52) U.S. Cl. .......................................... 320/101; 320/114
(58) Field of Search .................................. 320/101, 107, 320/114, 115

(56) References Cited

U.S. PATENT DOCUMENTS

| | | |
|---|---|---|
| D. 412,484 | 8/1999 | Salmi . |
| 3,573,479 | * 4/1971 | Rieth . |
| 4,939,707 | * 7/1990 | Nagao . |
| 5,254,931 | 10/1993 | Martensson . |
| 5,358,461 | 10/1994 | Bailey, Jr. . |
| 5,939,860 | 8/1999 | William . |
| 5,949,215 | 9/1999 | Takakura . |
| 5,973,477 | 10/1999 | Chang . |

* cited by examiner

*Primary Examiner*—Edward H. Tso

(57) ABSTRACT

A kinetic battery system for providing a reliable source of electric power for cellular telephones. The kinetic battery system includes an housing which is substantially hollow, an electric storage assembly designed for storing and releasing electric current positioned within the housing, an electric generation assembly designed for converting kinetic motion into electric current positioned substantially within the housing and electrically coupled to said electric storage assembly, and a plurality of electrical contacts extending outwardly from the housing and electrically coupled to the electric storage assembly to provide an electrical path from the kinetic battery system to a cellular telephone.

6 Claims, 2 Drawing Sheets

KINETIC BATTERY SYSTEM

BACKGROUND OF THE INVENTION

1. Field of the Invention

The present invention relates to battery chargers and more particularly pertains to a new kinetic battery system for providing a reliable source of electric power for cellular telephones.

2. Description of the Prior Art

The use of battery chargers is known in the prior art. More specifically, battery chargers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,973,477; 5,949,215; 5,254,931; 5,358,461; 5,939,860; and U.S. Pat. No. Des. 412,484.

While these devices fulfill their respective, particular objectives and requirements, the aforementioned patents do not disclose a new kinetic battery system. The inventive device includes an housing which is substantially hollow, an electric storage assembly designed for storing and releasing electric current positioned within the housing, an electric generation assembly designed for converting kinetic motion into electric current positioned substantially within the housing and electrically coupled to said electric storage assembly, and a plurality of electrical contacts extending outwardly from the housing and electrically coupled to the electric storage assembly to provide an electrical path from the kinetic battery system to a cellular telephone.

In these respects, the kinetic battery system according to the present invention substantially departs from the conventional concepts and designs of the prior art, and in so doing provides an apparatus primarily developed for the purpose of providing a reliable source of electric power for cellular telephones.

SUMMARY OF THE INVENTION

In view of the foregoing disadvantages inherent in the known types of battery chargers now present in the prior art, the present invention provides a new kinetic battery system construction wherein the same can be utilized for providing a reliable source of electric power for cellular telephones.

The general purpose of the present invention, which will be described subsequently in greater detail, is to provide a new kinetic battery system apparatus and method which has many of the advantages of the battery chargers mentioned heretofore and many novel features that result in a new kinetic battery system which is not anticipated, rendered obvious, suggested, or even implied by any of the prior art battery chargers, either alone or in any combination thereof.

To attain this, the present invention generally comprises an housing which is substantially hollow, an electric storage assembly designed for storing and releasing electric current positioned within the housing, an electric generation assembly designed for converting kinetic motion into electric current positioned substantially within the housing and electrically coupled to said electric storage assembly, and a plurality of electrical contacts extending outwardly from the housing and electrically coupled to the electric storage assembly to provide an electrical path from the kinetic battery system to a cellular telephone.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new kinetic battery system apparatus and method which has many of the advantages of the battery chargers mentioned heretofore and many novel features that result in a new kinetic battery system which is not anticipated, rendered obvious, suggested, or even implied by any of the prior art battery chargers, either alone or in any combination thereof.

It is another object of the present invention to provide a new kinetic battery system which may be easily and efficiently manufactured and marketed.

It is a further object of the present invention to provide a new kinetic battery system which is of a durable and reliable construction.

An even further object of the present invention is to provide a new kinetic battery system which is susceptible of a low cost of manufacture with regard to both materials and labor, and which accordingly is then susceptible of low prices of sale to the consuming public, thereby making such kinetic battery system economically available to the buying public.

Still yet another object of the present invention is to provide a new kinetic battery system which provides in the apparatuses and methods of the prior art some of the advantages thereof, while simultaneously overcoming some of the disadvantages normally associated therewith.

Still another object of the present invention is to provide a new kinetic battery system for providing a reliable source of electric power for cellular telephones.

Yet another object of the present invention is to provide a new kinetic battery system which includes an housing which is substantially hollow, an electric storage assembly designed for storing and releasing electric current positioned within the housing, an electric generation assembly designed for converting kinetic motion into electric current positioned substantially within the housing and electrically coupled to said electric storage assembly, and a plurality of electrical contacts extending outwardly from the housing and electrically coupled to the electric storage assembly to provide an electrical path from the kinetic battery system to a cellular telephone.

Still yet another object of the present invention is to provide a new kinetic battery system that allows cellular telephones to be used in remote locations without separate recharging facilities.

Even still another object of the present invention is to provide a new kinetic battery system that increases reliability of cellular communications by eliminating the potential for dead batteries.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
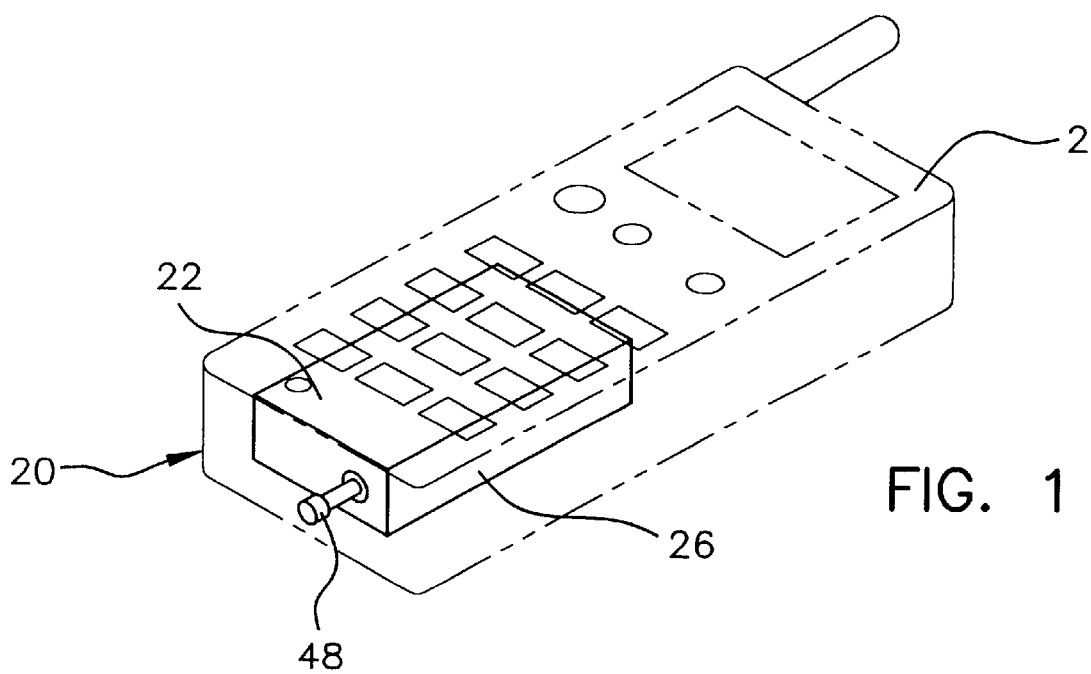
FIG. 1 is a schematic perspective view of a new kinetic battery system according to the present invention.
Figure 2:
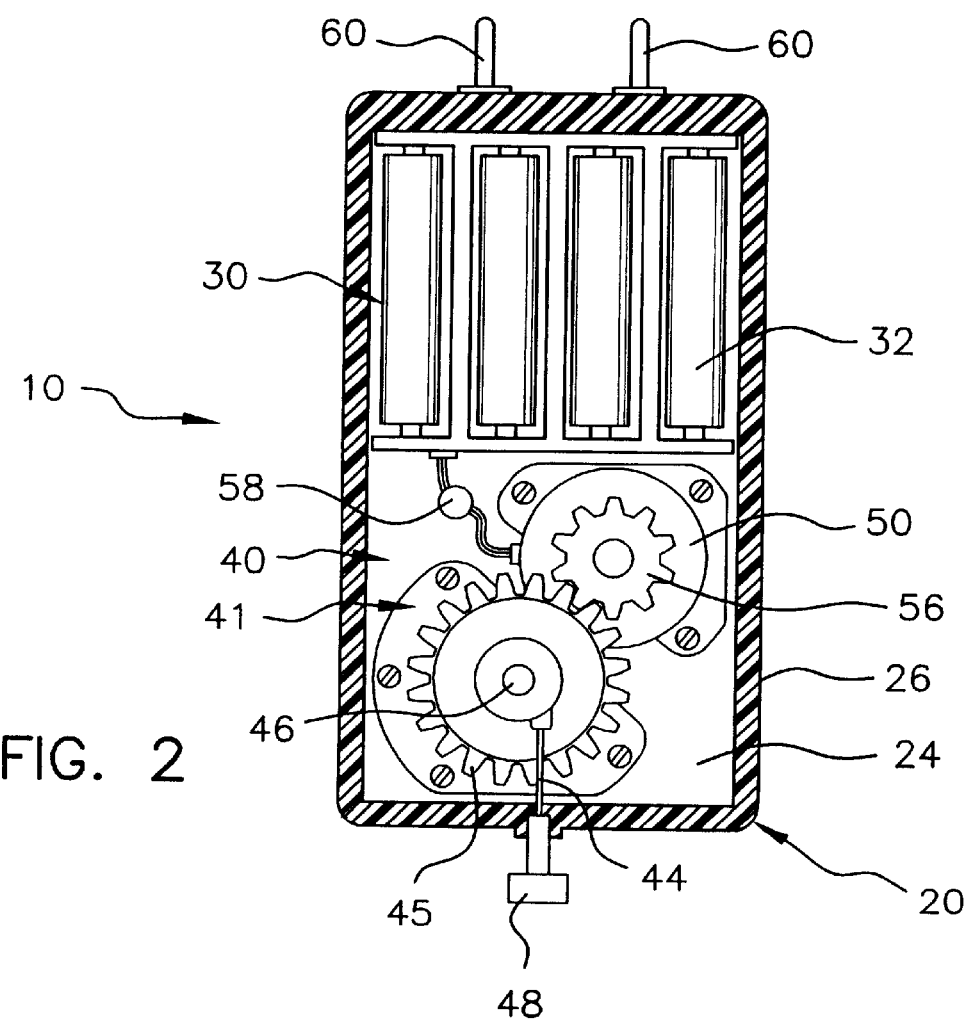
FIG. 2 is a schematic cross-sectional view of the present invention.
Figure 3:
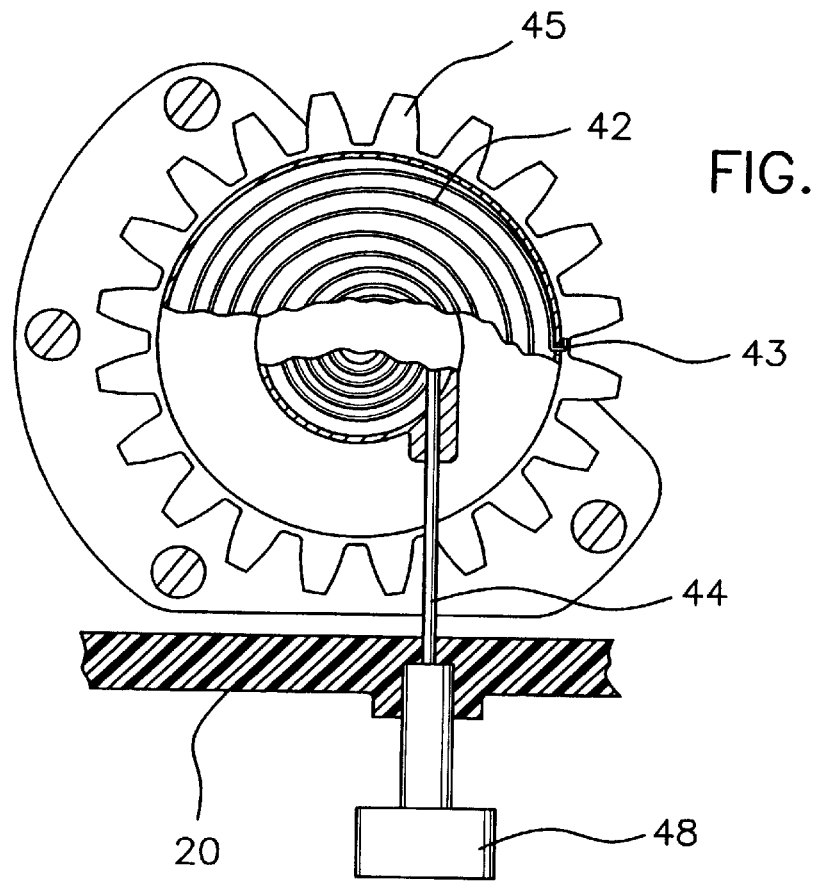
FIG. 3 is a schematic detail view of the kinetic drive assembly of the present invention.
Figure 4:
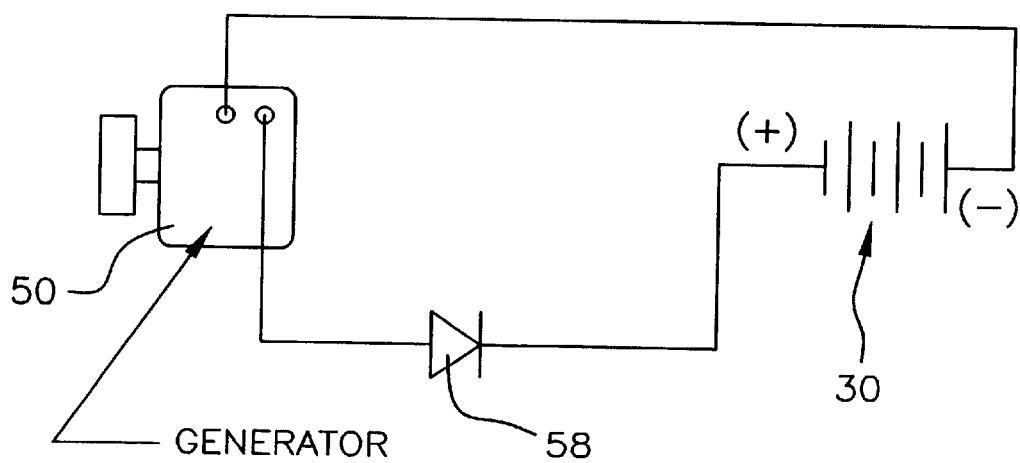
FIG. 4 is a schematic block diagram of the electrical circuit of the present invention.

With reference now to the drawings, and in particular to FIGS. 1 through 4 thereof, a new kinetic battery system embodying the principles and concepts of the present invention and generally designated by the reference numeral 10 will be described.

As best illustrated in FIGS. 1 through 4, the kinetic battery system 10 generally comprises an housing 20, an electrical storage assembly 30, an electric generation assembly 40, and a plurality of electrical contacts 60.

The housing 20 includes a front wall 22, a back 24, and four side-walls 26. The housing 20 is substantially hollow and rectangular.

The electric storage assembly 30 is designed for storing and releasing electric current. The electric storage assembly 30 is positioned within the housing 20.

The electric generation assembly 40 is designed for converting kinetic motion into electric current. The electric generation assembly 40 is positioned substantially within the housing 20. The electric generation assembly 40 is electrically coupled to the electric storage assembly 30.

Each one of the plurality of electrical contacts 60 has a distal end, which extends outwardly from the housing 20. Each one of the plurality of electrical contacts 60 is electrically coupled to the electric storage assembly 30. The plurality of electrical contacts 60 is designed for providing an electrical path from the kinetic battery system 10 to a cellular telephone 2.

The electric storage assembly 30 comprises a plurality of batteries 32. The plurality of batteries 32 is electrically connected in series.

In an embodiment the electric storage assembly 30 comprises four batteries 32 electrically connected in series.

The electrical generation assembly 40 comprises a kinetic drive assembly 41, a conversion gear member 56, and a generator 50.

The kinetic drive assembly 41 is for translating lateral kinetic motion into rotational kinetic motion. The conversion gear member 56 is coupled to the kinetic drive assembly 41. The generator 50 is for converting rotational kinetic motion into electric current. The generator 50 is operationally coupled to the kinetic drive assembly 41 through the conversion gear member 56.

The electrical generation assembly 40 further comprises a diode 58. The diode 58 is electrically coupled to an output of the generator 50 to control current flow from the generator 50 to the electrical storage assembly 30 to prevent reverse biasing the electrical storage assembly 30.

The kinetic drive assembly 41 comprises a drive gear member 45, a flexible elongate member 44, a biasing assembly 42, and a handle 48.

The drive gear member 45 is for generating rotational kinetic motion.

The flexible elongate member 44 has a first end and a second end. The first end is coupled to a shaft 46 of the drive gear member 45. The second end extends outwardly from the housing 20. The flexible elongate member 44 includes a length for wrapping around the shaft 46.

The biasing assembly 42 is for urging the shaft 46 to rotate in a first direction in order to wrap the flexible elongate member 44 around the shaft 46.

The handle 48 is coupled to the second end of the flexible elongate member 44. The handle 48 for facilitating pulling the flexible elongate member 44 and thereby urging the shaft 46 to rotate in a second direction such that the drive gear member 45 engages the conversion gear member 56 when the drive gear member 45 rotates in a second direction.

The biasing assembly 42 comprises a torsion spring 42 positioned between the housing 20 and the drive gear member 45. The torsion spring 42 has a first end coupled to the housing 20. The torsion spring 42 also has a second end 43 coupled to the drive gear member 45. Thus when the drive gear member 45 rotates in a second direction the torsion spring 42 is placed under tension and urges the drive gear member 45 to rotate in a first direction when the elongate flexible member 44 is released.

In use, the kinetic battery system is connected to a cellular phone in the conventional manner. When the kinetic battery system need to be recharged, the user simply pulls on the handle drawing the flexible elongate member from the housing. When the user releases the tension they have placed on the flexible elongate member, the torsion spring draws the flexible elongate member back into the housing and around the shaft of the drive gear member. As the drive gear member rotates, the generator is driven by the conversion gear member and electrical current flows to the electrical storage assembly for storage. The process of pulling and releasing the flexible elongate member is repeated until the desired charge is stored in the electrical storage assembly.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A kinetic battery system comprising:
   an housing having a front wall, a back wall, and four side-walls, said housing being substantially hollow, said housing being substantially rectangular;
   an electric storage assembly adapted for storing and releasing electric current, said electric storage assembly being positioned within said housing;
   an electric generation assembly adapted for converting kinetic motion into electric current, said electric generation assembly being positioned substantially within said housing, said electric generation assembly being electrically coupled to said electric storage assembly;
   a plurality of electrical contacts, each one of said plurality of electrical contacts having a distal end extending outwardly from said housing, each one of said plurality of electrical contacts being electrically coupled to said electric storage assembly, said plurality of electrical contacts being adapted for providing an electrical path from said kinetic battery system to a cellular telephone;
   wherein said electrical generation assembly comprises
      a kinetic drive assembly for translating lateral kinetic motion into rotational kinetic motion,
      a conversion gear member coupled to said kinetic drive assembly, and
      a generator for converting rotational kinetic motion into electric current, said generator being operationally coupled to said kinetic drive assembly through said conversion gear member; and
   wherein said kinetic drive assembly comprises
      a drive gear member for generating rotational kinetic motion,
      a flexible elongate member having a first end and a second end, said first end being coupled to a shaft of said drive gear member, said second end extending outwardly from said housing, said flexible elongate member having a length for wrapping around said shaft,
      a biasing assembly for urging said shaft to rotate in a first direction to wrap said flexible elongate member around said shaft, and
      a handle coupled to said second end of said flexible elongate member, said handle for facilitating pulling said flexible elongate member and thereby urging said shaft in a second direction such that said drive gear member engages said conversion gear member when said drive gear member rotates in a second direction.

2. The kinetic battery system of claim 1, wherein said electric storage assembly comprises a plurality of batteries, said plurality of batteries being electrically connected in series.

3. The kinetic battery system of claim 1, wherein said electric storage assembly comprises four batteries, said four batteries being electrically connected in series.

4. The kinetic battery system of claim 1, wherein said electrical generation assembly further comprises:
   a diode electrically coupled to an output of said generator to control current flow from said generator to said electrical storage assembly to prevent reverse biasing said electrical storage assembly.

5. The kinetic battery system of claim 1, wherein said biasing assembly comprises:
   a torsion spring positioned between said housing and said drive gear member, said torsion spring having a first end coupled to said housing, said torsion spring having a second end coupled to said drive gear member, such that when said drive gear member rotates in a second direction said torsion spring is placed under tension and urges said drive gear member to rotate in a first direction when said elongate flexible member is released.

6. A kinetic battery system comprising:
   an housing having a front wall, a back wall, and four side-walls, said housing being substantially hollow, said housing being substantially rectangular;
   an electric storage assembly adapted for storing and releasing electric current, said electric storage assembly being positioned within said housing;
   an electric generation assembly adapted for converting kinetic motion into electric current, said electric generation assembly being positioned substantially within said housing, said electric generation assembly being electrically coupled to said electric storage assembly;
   a plurality of electrical contacts, each one of said plurality of electrical contacts having a distal end extending outwardly from said housing, each one of said plurality of electrical contacts being electrically coupled to said electric storage assembly, said plurality of electrical contacts being adapted for providing an electrical path from said kinetic battery system to a cellular telephone;
   said electric storage assembly comprises a plurality of batteries, said plurality of batteries being electrically connected in series;
   wherein said electric storage assembly comprises four batteries, said four batteries being electrically connected in series;
   said electrical generation assembly comprises:
      a kinetic drive assembly for translating lateral kinetic motion into rotational kinetic motion;
      a conversion gear member coupled to said kinetic drive assembly;
      a generator for converting rotational kinetic motion into electric current, said generator being operationally coupled to said kinetic drive assembly through said conversion gear member;
   said electrical generation assembly further comprises:
      a diode electrically coupled to an output of said generator to control current flow from said generator to said electrical storage assembly to prevent reverse biasing said electrical storage assembly;

said kinetic drive assembly comprises:
- a drive gear member for generating rotational kinetic motion;
- a flexible elongate member having a first end and a second end, said first end being coupled to a shaft of said drive gear member, said second end extending outwardly from said housing, said flexible elongate member having a length for wrapping around said shaft;
- a biasing assembly for urging said shaft to rotate in a first direction to wrap said flexible elongate member around said shaft; and
- a handle coupled to said second end of said flexible elongate member, said handle for facilitating pulling said flexible elongate member and thereby urging said shaft in a second direction such that said drive gear member engages said conversion gear member when said drive gear member rotates in a second direction; and said biasing assembly comprises:
- a torsion spring positioned between said housing and said drive gear member, said torsion spring having a first end coupled to said housing, said torsion spring having a second end coupled to said drive gear member, such that when said drive gear member rotates in a second direction said torsion spring is placed under tension and urges said drive gear member to rotate in a first direction when said elongate flexible member is released.

* * * * *